United States Patent Office 2,709,166
Patented May 24, 1955

2,709,166

AZOXY-AZO-DYESTUFFS

Walter Hanhart, Riehen, Switzerland, assignor to Ciba Limited, Basel, Switzerland, a Swiss firm No Drawing. Application July 16, 1951,
Serial No. 237,059

Claims priority, application Switzerland July 21, 1950

7 Claims. (Cl. 260—143)

This invention relates to the manufacture of new, valuable azo-azoxy dyestuffs.

According to the process of the invention a diazo compound of an amine of the general formula

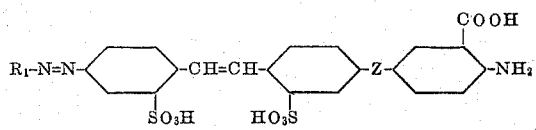

in which $R_1$ indicates a benzene radical substituted by an alkoxy group, for example the methoxy group, and Z an azo or azoxy group, is coupled with a pyrazolone of the formula

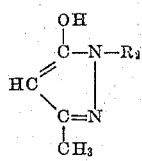

in which $R_2$ indicates a radical containing two benzene rings, one benzene ring being attached directly to the nitrogen atom of the pyrazolone ring, and being itself attached in one of the positions meta and para to its own point of attachment, if desired by means of a bridge member, to the second benzene ring.

In the present process such starting materials of the above formulae are used with advantage, as contain in the radicals $R_1$ and $R_2$ no solubilizing groups such as sulfonic acid and carboxylic acid groups. Thus $R_2$ may be a diphenyl radical free from sulfonic acid groups.

The aminoazo dyestuffs of the above formula serving as starting materials in the present process may be prepared in various ways.

Thus for example diazotized 4-nitro-4'-aminostilbene-2:2'-disulfonic acid may be coupled with a hydroxybenzene, preferably with hydroxybenzene itself, or also with 3-methyl-1-hydroxybenzene, the hydroxyl group thereupon alkylated (for example with an ethylating or preferably with a methylating agent such as ethyl or methyl bromide or chloride, diethyl sulfate or dimethyl sulfate) and the nitromonoazo dyestuff thus obtained condensed with 2:5-diaminobenzene-1-carboxylic acid.

Instead of carrying out this latter condensation, the nitromonoazo dyestuff may also be reduced to the aminoazo dyestuff and this latter diazotized and coupled with 2-aminobenzene-1-carboxylic acid.

A further method of preparation of the starting materials set forth above consists in that diazotized 4-nitro-4'-aminostilbene-2:2'-disulfonic acid is coupled with 2-aminobenzene-1-carboxylic acid, the amino group in the aminoazo dyestuff obtained acylated (for example acetylated), the nitro group in the 4-position of the stilbene radical reduced to the amino group and thereupon the reaction product diazotized and coupled with a hydroxybenzene, the hydroxyl group alkylated and finally the acylamino group hydrolyzed.

The reactions necessary for the preparation of the starting materials can all be carried out in the conventional manner. The couplings with the hydroxybenzenes are suitably effected in an alkaline medium, for example in a medium rendered alkaline with an alkali carbonate. The condensation of the nitromonoazo dyestuff with the 2:5-diaminobenzene-1-carboxylic acid is carried out, for example, by heating the substances in dilute alkali hydroxide solution. The group Z thereby produced can be an azo or azoxy group.

The reduction of the nitro compounds to the amines must obviously be carried out in such a manner that the azo group is not attacked, for example by means of alkali or ammonium sulfides at about 60–70° C. The 2-aminobenzene-1-carboxylic acid is suitably coupled in a weakly acid medium, for example a medium acid with acetic acid and buffered with alkali acetate, and in the form of the ω-methane sulfonic acid. When the coupling is complete the ω-methane sulfonic acid group is split off, for example by heating in dilute alkali hydroxide solution.

As stated above, the radical $R_2$ of the pyrazolones of the formula

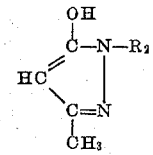

serving as starting materials for the present process, contains two benzene rings, one benzene ring being attached directly to the nitrogen atom of the pyrazolone ring, and being itself attached in one of the positions meta or para to its own point of attachment, if desired by means of a bridge member, to the second benzene ring. The bridge member may be for example a —CO—NH—, —NH—OC— or —O— bridge. The radical $R_2$ should not contain, in addition to these two benzene rings, which are not condensed together, any further rings, but it can however contain, especially in the outer benzene ring, that is to say the one not directly attached to the pyrazolone ring, the customary substituents, for example lower alkyl or alkoxy groups, such as a methyl or methoxy group, halogen atoms, especially chlorine, free or substituted amino groups such as a methylamino or acetylamino group.

As examples of suitable pyrazolones there may be mentioned:

1-[1':1''-diphenyl-(4')]-3-methyl-5-pyrazolone of the formula

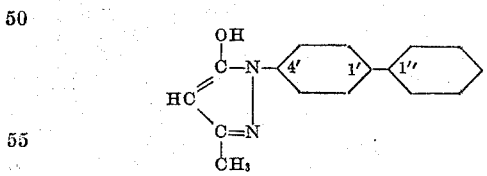

1-[4''-amino-1':1''-diphenyl-(4')]-3-methyl-5-pyrazolone,
1 - [4'' - acetylamino - 1':1'' - diphenyl - (4')] - 3 - methyl - 5 - pyrazolone,
1-(4'-benzoylamino)-phenyl-3-methyl-5-pyrazolone,
1-(3'-benzoylamino)-phenyl-3-methyl-5-pyrazolone,
1-phenyl-(1')-3-methyl-5-pyrazolone-3'-carboxylic acid phenyl amide,
1-(4'-phenoxy)-phenyl-3-methyl-5-pyrazolone.

The diazotization of the amines of the formula set forth above takes place with advantage by the so-called indirect method, that is to say by combining a solution of an alkali salt of the compound to be diazotized, which solution contains a small excess of alkali, with an excess of dilute hydrochloric acid. The coupling of the diazo compounds with the pyrazolone is suitably effected in an alkaline medium.

The dyestuffs obtainable according to any of the methods of the present process, are new and correspond to the general formula

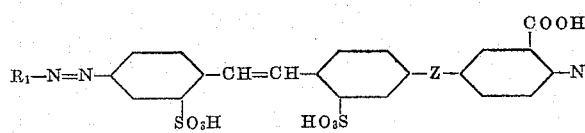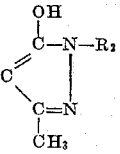

in which $R_1$ indicates a benzene radical substituted by an alkoxy group, for example the methoxy group, Z an azo or azoxy group and $R_2$ a radical containing two benzene rings, one benzene ring being attached directly to the nitrogen atom of the pyrazolone ring, and being itself attached in one of the positions meta or para to its own point of attachment, if desired by means of a bridge member, to the second benzene ring. The radicals $R_1$ and $R_2$ are advantageously free from solubilizing groups. Thus $R_2$ may be a diphenyl radical free from sulfonic acid groups.

These dyestuffs are suitable for the dyeing of a wide variety of materials, for example animal fibers such as wool, silk and leather, but especially for the dyeing and printing of cellulosic materials such as cotton, linen, artificial silk and staple fiber from regenerated cellulose. The dyestuffs may be converted in substance, in the dyebath and on the fiber into complex metal compounds, for example, copper, chromium, iron, nickel or cobalt compounds. The conversion into such complex metal compounds takes place by conventional methods in an acid, neutral or alkaline medium, with or without pressure and with or without additions such as salts of inorganic or organic acids, such as tartaric acid or of acid-binding agents or agents promoting the complex formation, such as pyridine. Especially valuable dyeings are obtained when these dyestuffs are treated on the fiber or partly on the fiber and partly in the dyebath, with agents providing metal according to conventional processes. With advantage, for example, the process of U. S. Patent No. 2,148,659 can be used, according to which, in the same bath first dyeing is carried out and then the treatment with agents providing metal. As agents providing metal there are preferably applied in this case such as are stable towards alkaline solutions, such as complex copper tartrates.

In many cases especially valuable dyeings can be obtained by working by the process according to which the dyeings or printings produced with the metal-free dyestuffs, are after-treated with such aqueous solutions as contain the basic formaldehyde-condensation products of compounds which contain in the molecule at least once the atom grouping.

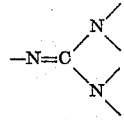

or, as for example in the case of cyanamide, are easily converted into such compounds, and water soluble, especially complex, copper compounds. Such processes are described for example in British Patent No. 619,969.

The following examples illustrate the invention, the parts being by weight unless otherwise stated and the percentages also being by weight and the relation between parts by weight and parts by volume being the same as that between the kilogram and the liter:

*Example 1*

51.9 parts of the dyestuff obtained by diazotization of 4-nitro-4'-aminostilbene-2:2'-disulfonic acid and coupling with hydroxybenzene and by subsequently methylating the hydroxyl group attached to the benzene nucleus, in the form of the sodium salt, are dissolved in 750 parts of water. To the solution produced is added a solution of 18 parts of 2:5-diaminobenzene-1-carboxylic acid in 200 parts of hot water and also 16 parts of sodium hydroxide solution of 30 per cent strength and then to the mixture 80 parts of sodium hydroxide solution of 30 per cent strength are further added. The whole is boiled for 4 hours, 150 parts of sodium chloride introduced and, after cooling, filtration carried out and the material on the filter washed with 15 per cent sodium chloride solution which has been rendered alkaline with a little sodium hydroxide. If desired, the product thus obtained can be purified by dissolving it in dilute sodium hydroxide solution, precipitating it again by addition of sodium chloride and filtering.

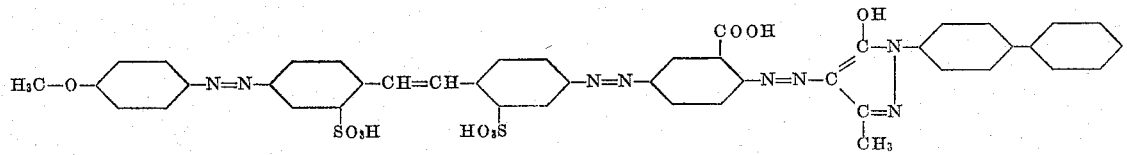

or

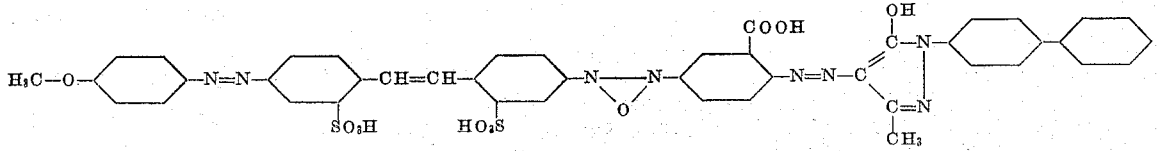

35 parts of the trisodium salt, thus produced, of the disazo dyestuff, are dissolved with heating in 500 parts of water and after the addition of 3.5 parts of sodium nitrite in the form of a 20 per cent solution, poured with good stirring into a mixture of ice and 27.5 parts of 30 per cent hydrochloric acid and the whole stirred for several hours at 0–5° C. Thereupon combination is carried out with a solution which is alkaline with sodium carbonate, of 12.8 parts of 1-[1':1''-diphenyl-(4')]-3-methyl-5-pyrazolone. When the coupling is complete there are added 10 parts of sodium chloride for each 100 parts by volume of the reaction mixture and heating is carried out until the dyestuff has assumed a form suitable for filtration. After filtration and drying a brown red powder is obtained which dissolves in concentrated sulfuric acid with a blue, in water with an orange coloration and which dyes cotton by the single- or two-bath after-coppering process, in red-orange shades which are fast to light and washing. The dyestuff corresponds to the formula Similar dyestuffs are obtained when the disazo dyestuffs which are obtained by diazotization of one of the compounds of the formulae

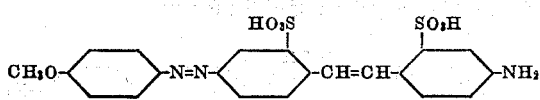

or

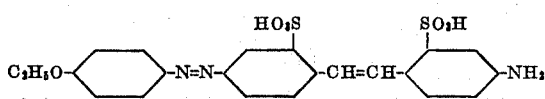

and coupling with the ω-methane sulfonic acid of 2-aminobenzoic acid with subsequent hydrolysis of the ω-methane sulfonic acid, are diazotized and coupled with 1-[1':1''-diphenyl-(4')]-3-methyl-5-pyrazolone.

Further valuable dyestuffs with similar properties are obtained by operating in accordance with the directions of the first paragraph of this example but using instead of 1-[1':1''-diphenyl-(4)]-3-methyl-5-pyrazolone the equivalent quantity of 1-[4''-amino- or 4''-acetylamino-1'1''-diphenyl-(4')]-3-methyl-5-pyrazolone, 1-(3' or 4'-benzoylamino)-phenyl-3-methyl-5-pyrazolone or 1-phenyl-(1')-3-methyl-5-pyrazolone-3'-carboxylic acid phenylamide or 1-(4'-phenoxy)-phenyl-3-methyl-5-pyrazolone.

The dyestuffs thus obtainable correspond to the formula

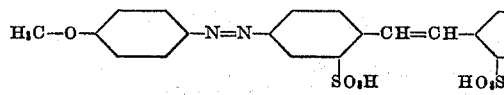

wherein Z is —N=N— or

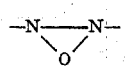

and wherein R stands for one of the radicals and

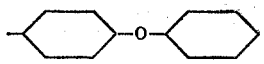

The dyestuff obtainable in the afore-described manner from 1-(4'-benzoylamino)-phenyl-3-methyl-5-pyrazolone can also be obtained by using instead of this compound the 1-(4'-amino)-phenyl-3-methyl-5-pyrazolone and thereupon benzoylating the aminoazo dyestuff obtained, in the known manner.

*Example 2*

100 parts of cotton are entered at 50° C. into a dyebath which contains, in 4000 parts of water, 1.25 parts of the dyestuff obtainable according to Example 1 and 2 parts of anhydrous sodium carbonate, the temperature is raised in the course of 20 minutes to 90–95° C., 40 parts of crystalline sodium sulfate are added and dyeing is carried on for 30 minutes at 90–100° C. Thereupon cooling takes place to 70° C., 1.25 parts of complex sodium copper tartrate of approximately neutral reaction are added, coppering proceeds for ½ hour at about 80° C. and then the dyeing is rinsed with cold water. If desired the dyeing can be soaped by after-treatment with a solution containing 5 parts of soap and 2 parts of anhydrous sodium carbonate in 1000 parts by volume of water. A red orange dyeing of good fastness to light and washing is obtained.

What is claimed is:

1. An azo-azoxy dyestuff of the formula

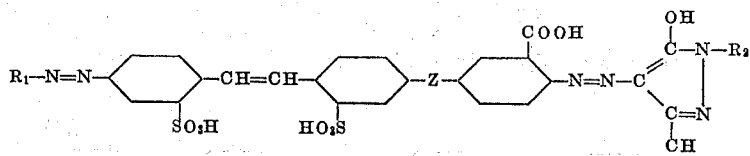

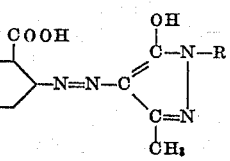

in which $R_1$ represents a benzene radical free from solubilizing groups and substituted in para-position to the azo group by an alkoxy group containing at the most two carbon atoms, Z stands for a member selected from the group consisting of an azo group and an azoxy group and $R_2$ represents a radical containing two benzene rings, one benzene ring being attached directly to the nitrogen atom of the pyrazolone ring and being itself attached in one of the positions meta and para to its own point of attachment by a member of the group consisting of a direct linkage, an —NH—CO— group, a —CO—NH— group and an —O— bridge to the second benzene ring, both benzene rings being free from solubilizing groups.

2. An azo-azoxy dyestuff of the formula

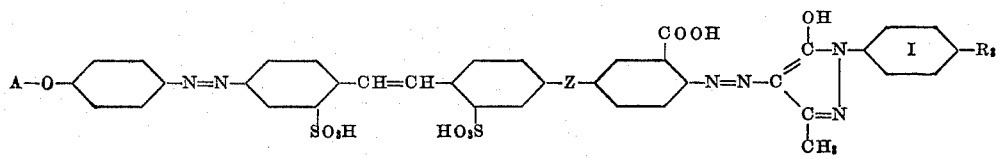

in which A represents an alkyl group containing at the most two carbon atoms, Z stands for a member selected from the group consisting of an azo group and an azoxy

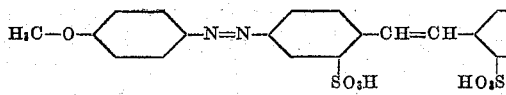

group, and R₃ represents a benzene radical bound directly to the benzene radical marked I and being free from solubilizing groups.

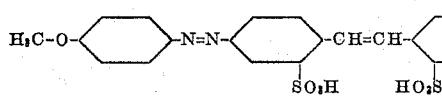

3. An azo-azoxy dyestuff of the formula

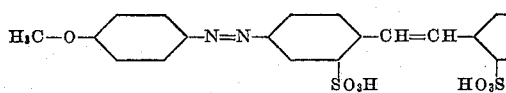

in which Z stands for a member selected from the group consisting of an azo group and an azoxy group, one X

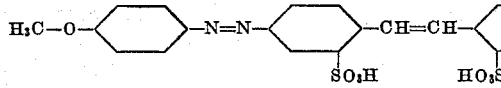

stands for a hydrogen atom and the X stands for

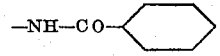

4. An azo-azoxy dyestuff of the formula

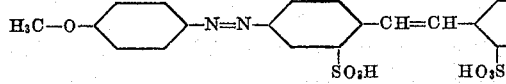

in which Z stands for a member of the group consisting of an azo group and an azoxy group.

5. An azo-azoxy dyestuff of the formula

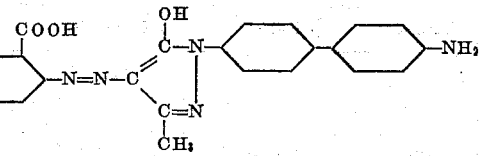

in which Z stands for a member of the group consisting of an azo group and an azoxy group.

6. An azo-azoxy dyestuff of the formula

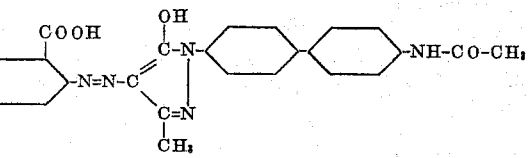

in which Z stands for a member of the group consisting

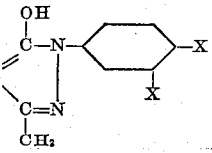

of an azo group and an azoxy group.

7. An azo-azoxy dyestuff of the formula

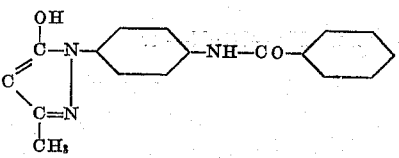

in which Z stands for a member of the group consisting of an azo group and an azoxy group.

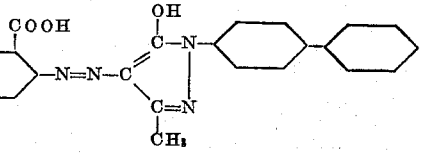

References Cited in the file of this patent
UNITED STATES PATENTS

| | | |
|---|---|---|
| 2,029,591 | Schindhelm et al. | Feb. 4, 1936 |
| 2,056,539 | Schindhelm et al. | Oct. 6, 1936 |
| 2,405,353 | Hanhart | Aug. 6, 1946 |